United States Patent [19]

Rayner

[11] 4,420,902
[45] Dec. 20, 1983

[54] MODULAR PLANTING APPARATUS

[76] Inventor: Maxwell A. Rayner, 76 Hindes St., Lota, Queensland, Australia

[21] Appl. No.: 308,553
[22] PCT Filed: Jan. 29, 1981
[86] PCT No.: PCT/AU81/00012
§ 371 Date: Sep. 29, 1981
§ 102(e) Date: Sep. 29, 1981
[87] PCT Pub. No.: WO81/02087
PCT Pub. Date: Aug. 6, 1981

[30] Foreign Application Priority Data

Jan. 29, 1980 [AU] Australia .............................. PE2168

[51] Int. Cl.³ .............................................. A01G 9/00
[52] U.S. Cl. .......................................... 47/66; 47/39; 47/83
[58] Field of Search ............... 47/33, 66, 68, 82–83, 47/86, 39; 46/26

[56] References Cited

U.S. PATENT DOCUMENTS

| 780,627 | 1/1905 | Umbehend | 47/66 X |
| 986,395 | 3/1911 | King | 47/33 |
| 2,152,869 | 4/1939 | Campbell | 47/82 |
| 3,917,318 | 11/1975 | Legris | 46/26 X |
| 4,120,119 | 10/1978 | Engel | 47/68 X |

Primary Examiner—Robert E. Bagwill
Attorney, Agent, or Firm—Sughrue, Mion, Zinn, Macpeak and Seas

[57] ABSTRACT

A modular planting apparatus which includes a plurality of tubular modules having access slots in the tops of the side walls and connectors for joining adjacent modules.

7 Claims, 6 Drawing Figures

MODULAR PLANTING APPARATUS

This invention relates to modular planting apparatus.

Hitherto planting apparatus or "planters" have been of a stereotyped nature and have often been used in fixed locations in a house or garden. Normally a conventional planter will comprise a large bowl type container or pot containing soil and other plant nutrient material within which the plants will grow.

However, there has now been a more pressing requirement for planters to have a different type of appearance to the conventional "pot plant" and also for planters to be more versatile in application. Thus it is now desirable that planters be used, for example, as floral displays, or on feature walls within the lounge or living room kitchen or patio. It is also desirable that the plants may be substituted within the planter as required. It is also required that the planter be transported to different locations within the house when desired.

It is therefore an object of the invention to provide a modular planting apparatus which is versatile in use and which is of a non-stereotyped appearance when compared to the prior art.

The invention provides a modular planting apparatus including a plurality of tubular modules, each module having an access slot in a top part of the side wall thereon in use whereby the interior of each module is adapted to contain soil or other plant nutrient material. There is also provided connection means between adjacent modules and there also may be provided support means for the plurality of modules.

Each module may be of any suitable cross section, but is preferably round so that each module is cylindrical in shape. Each cylindrical module is suitably open ended and each end thereof is provided with end caps. The access slot may extend the length of the cylinder, but more suitably occupies only the mid region of the cylinder. Soil or plant nutrient material may be placed in the interior of the cylinder through the slot or alternatively individual planters such as pots or specially designed planters adopted to be fitted within the interior of the cylinder may be used.

There is provided connection means for connection together of adjacent modules and any suitable connection means may be used for this purpose. Thus in one form there may be provided the above-mentioned end caps whereby adjacent end caps of adjoining modules may be screwed together. Preferably there are provided additional end pieces or intermediate pieces which are of greater diameter than the end caps. Each end cap may be of complementary shape to its associated tubular module. A screw may be used to attach the ends of mutually adjacent modules to an intermediate interconnection piece or block or to interconnect an end piece or block to an adjoining end cap of an adjacent tubular module.

The modules may be assembled to each other as described above, not only in a horizontal direction but also in a vertical direction. Thus in one embodiment there may be provided a framework of such modules which are interconnected to each other. A suitable framework may be formed by a main support stem which has attached thereto intermediate its height a cruciform shaped arrangement of horizontal cross members.

Various other arrangements are also possible such as a repeating framework of interconnected modules. If desired there may be provided support means for supporting the framework of modules and this may include a support base or support members (e.g. screws, nails etc.) attaching tubular modules to support surfaces such as walls or lattice screens.

Reference is now made to the attached drawings which illustrate a preferred embodiment of the present invention.

Figure 1:
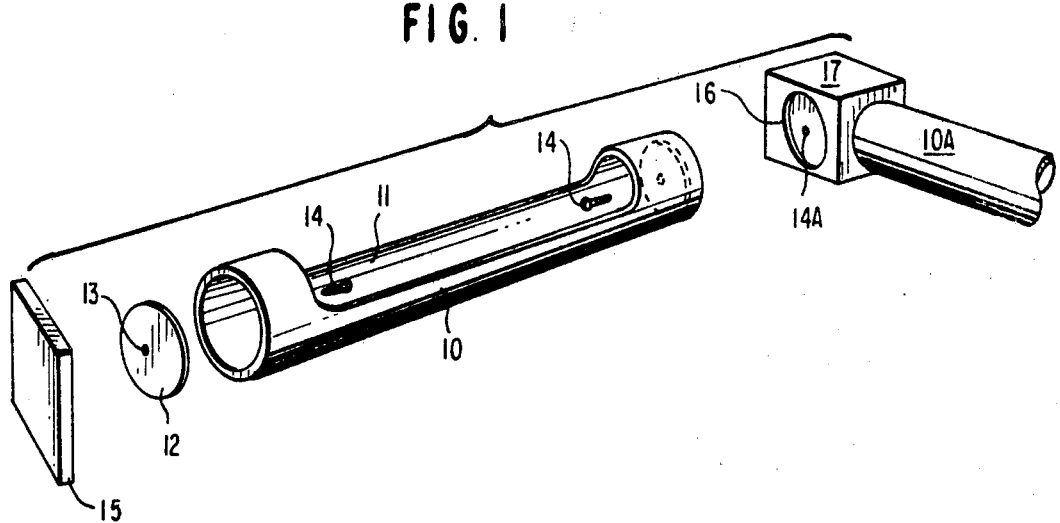
FIG. 1 is an exploded view of a planter framework constructed in accordance with the invention.

In the drawings, there is shown tubular module 10 having access slot 11 for the insertion of plants or plant nutrient material. Module 10 is provided with end caps 12 which are bonded to an adjacent interior surface of module 10. End caps 12 may be formed in the same injection moulding process which produces tubular modules 10. There is also shown end block 15 and intermediate block 17 which interconnects modules 10 with adjacent module 10A. Module 10 is attached to intermediate block 17 by having an end peripheral edge engaging in groove or recess 16. Screws 14 engage in apertures 13 of each end cap or plate 12 and which locate in block 17 as indicated at 14A.

Figure 2:
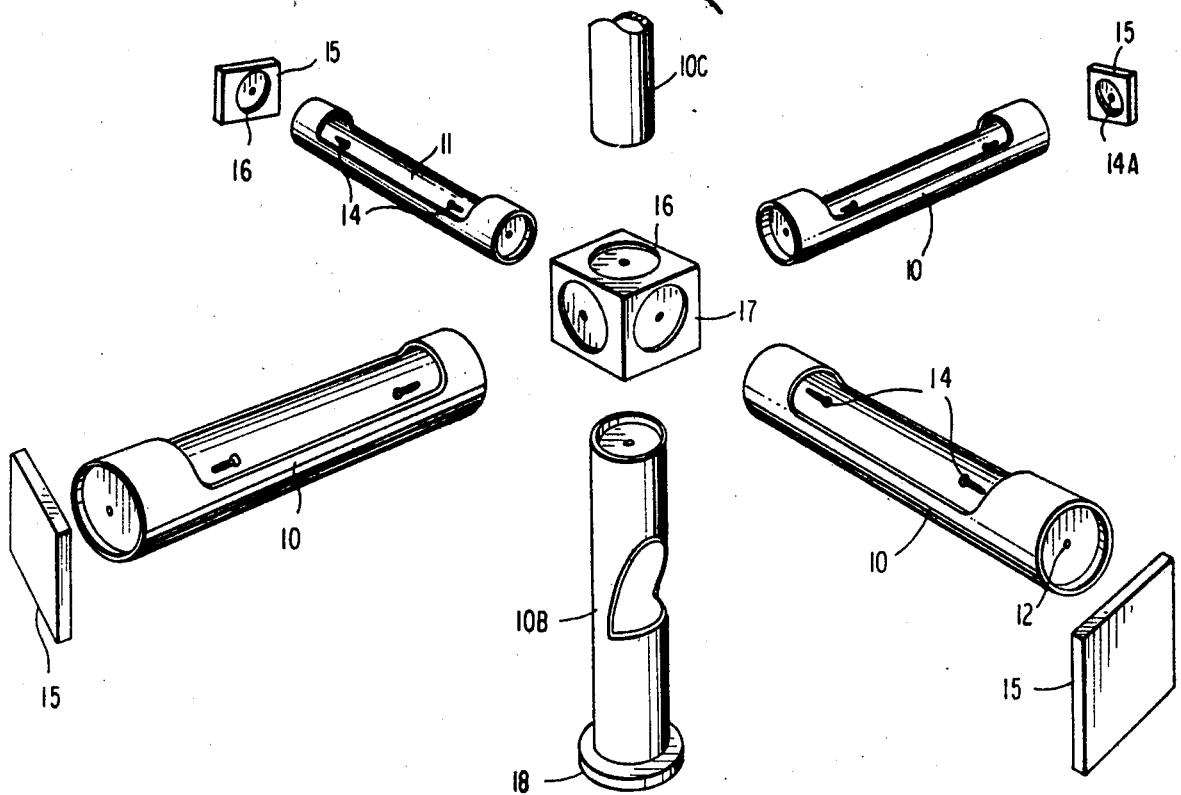
FIG. 2 is an exploded view of an alternative planter framework constructed in accordance with the invention.

FIG. 2 shows a cruciform arrangement comprising four modules 10 and associated end blocks 15. There is also shown central interconnecting block 17 which also engages with upright modules 10B and 10C as shown. Upright 10B is mounted on mounting ring 18.

Figure 3:
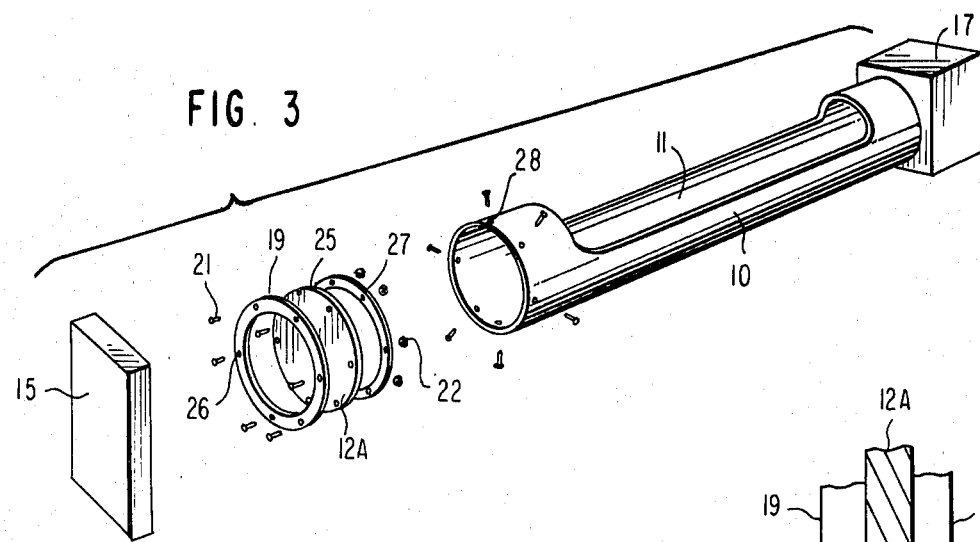
FIG. 3 is an exploded view of a planter framework constructed in accordance with the invention but showing a different form of connection between adjacent tubular modules.
Figure 4:
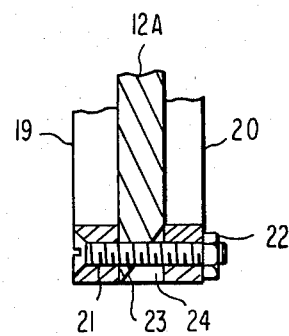
FIG. 4 is a detailed view of the connection means used in FIG. 3.

FIG. 3 shows module 10 being attached to end block 15 by an assembly comprising end plate 12A, outer mounting ring 19, inner mounting ring 20 and bolts 21 and associated nuts 22 which engage through coaligned apertures 26, 25 and 27 in members 19, 12A and 20 respectively. Each end plate 12A is provided with a bevel 23 for the addition of sealing compound 24 which bonds end plate 12A to the interior surface of tubular module 10. A detailed view of this interconnection is shown in FIG. 4.

Figure 5:
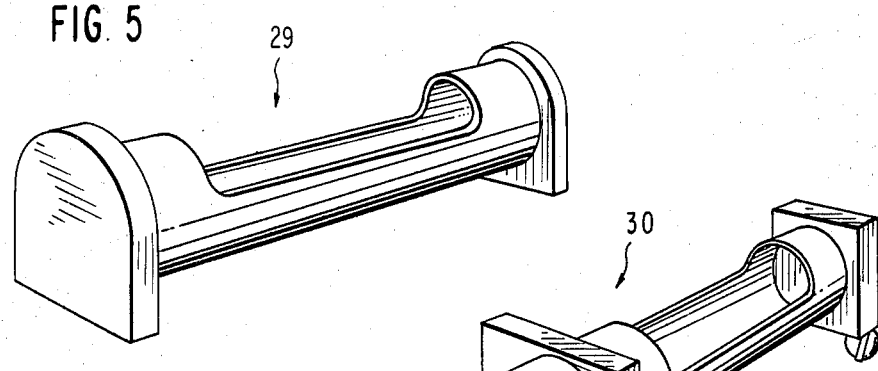
FIGS. 5 and 6 show different arrangements of planter frameworks falling within the scope of the invention.
Figure 6:
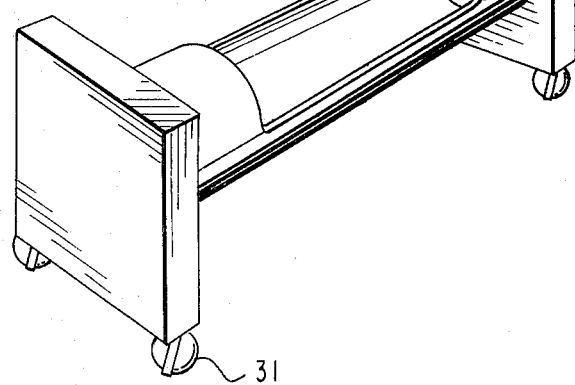

In relation to FIGS. 5 and 6 there are shown a single modular framework 29 and a double modular framework 30 mounted on castors 31.

I claim:

1. A modular planting apparatus comprising a plurality of separate tubular modules each having a continuous side wall having an access opening therethrough whereby the interior of each module is adapted to contain planting material, an end cap secured to each end of each tubular module, at least one connector block interposed between adjoining tubular modules and connecting means associated with each connector block for connecting an adjacent end cap of a tubular module thereto.

2. A modular planting apparatus as claimed in claim 1 wherein each end cap is of a size which is complementary to the internal dimension of an associated tubular module whereby each end cap is located completely within the tubular module.

3. A modular planting apparatus as claimed in claim 1 wherein each connector block is provided with at least one face having a recess therein adapted to receive an end of a tubular module therein.

4. A modular planting apparatus as claimed in claim 3 wherein each connector block is provided with a plurality of faces each having a recess therein for receiving an end of a tubular module.

5. A modular planting apparatus as claimed in claim 1 wherein the peripheral edge of said end cap is beveled and an inner ring and an outer ring are secured to opposite faces of each end cap adjacent said peripheral edge by means of bolts extending through aligned apertures in said clamping rings and said end cap to define a peripheral recess for receiving a sealing compound to bond said end plate to the interior surface of a tubular module.

6. A modular planting apparatus as claimed in claim 1 wherein each end cap is bonded to an adjacent interior surface of a tubular module.

7. A modular planting apparatus as claimed in claim 1 wherein each tubular module has a cylindrical configuration.

* * * * *